US007203593B2

(12) United States Patent
Lepley et al.

(10) Patent No.: US 7,203,593 B2
(45) Date of Patent: Apr. 10, 2007

(54) AIR STARTER AND ELECTRONIC CONTROL THEREFOR

(75) Inventors: Joseph M. Lepley, Girard, OH (US); Gary A. Kleinfelder, Mercer, PA (US)

(73) Assignee: Altronic, Inc., Girard, OH (US)

( * ) Notice: Subject to any disclaimer, the term of this patent is extended or adjusted under 35 U.S.C. 154(b) by 164 days.

(21) Appl. No.: 11/169,505

(22) Filed: Jun. 29, 2005

(65) Prior Publication Data

US 2007/0005222 A1 Jan. 4, 2007

(51) Int. Cl.
*G06F 19/00* (2006.01)
*F01L 9/02* (2006.01)

(52) U.S. Cl. ..................... 701/113; 123/90.12; 123/347

(58) Field of Classification Search ................ 701/101, 701/105, 113, 114, 115; 123/90.1, 60.12, 123/90.15, 179.5, 179.16, 179.18, 321, 322, 123/345–348
See application file for complete search history.

(56) References Cited

U.S. PATENT DOCUMENTS

| | | | | |
|---|---|---|---|---|
| 3,722,210 | A | 3/1973 | Kuhn | |
| 4,324,212 | A | 4/1982 | Samuel et al. | |
| 4,501,248 | A * | 2/1985 | Eisele et al. | 123/478 |
| 4,915,598 | A * | 4/1990 | Kubis | 417/380 |
| 4,920,789 | A * | 5/1990 | Gomez et al. | 73/118.2 |
| 5,323,743 | A * | 6/1994 | Kristiansson | 123/179.3 |
| 6,092,365 | A * | 7/2000 | Leidel | 60/39.63 |
| 6,125,808 | A | 10/2000 | Timewell | |
| 6,286,469 | B1 * | 9/2001 | Cobb, Jr. | 123/73 C |
| 6,715,453 | B2 * | 4/2004 | Tomatsuri et al. | 123/41 E |
| 2002/0194850 | A1 * | 12/2002 | Zaleski | 60/698 |

* cited by examiner

*Primary Examiner*—John T. Kwon
(74) *Attorney, Agent, or Firm*—The Webb Law Firm

(57) ABSTRACT

An in-head compressed air start-up system for an internal combustion engine comprises an absolute angular position detector for the crankshaft outputting an electrical signal indicative of the angular position, a computer for storing a table of the firing order of the cylinders and the angular position of the crankshaft at which each piston reaches a desired angular position relative to top dead center (TDC), wherein the computer means compares the signal indicative of angular position of the crankshaft to the firing order table and generates a plurality of signals sequentially open and close solenoid valves to cause rotation of the crankshaft.

34 Claims, 9 Drawing Sheets

AIR STARTER AND ELECTRONIC CONTROL THEREFOR

BACKGROUND OF THE INVENTION

1. Field of the Invention

The present invention relates to a starting system for large internal combustion engines, for example, large natural gas fueled engines, provided with associated air compressors and in-head air starting valves.

2. Description of Related Art

It is known in the art to provide starting systems for multi-cylinder internal combustion engines, for example, those located at remote locations, by use of compressed air stored at the site of the internal combustion engine. The compressed air may be restored when the internal combustion engine is running by a compressor driven by the engine. These systems direct the compressed air to one or more cylinders of the engine at the proper crank angle and in the proper order to drive rotation of the engine crankshaft to a start-up speed.

Some prior art systems are entirely mechanical and comprise a compressed air distributor that is driven by the camshaft. A rotating distributor disk directs compressed air to conduits connected to valves in the head of each driven cylinder. One example of a mechanical starting system is disclosed in U.S. Pat. No. 3,722,210 entitled "Rotary Pneumatic Starter Distributor for Internal Combustion Engine." The mechanical starting systems have been implemented to provide advance of timing of the compressed air directed to each cylinder with increase in speed by mechanical rotation of the distributor. The advance results in more economical use of starting air and helps to achieve start-up speed.

Other prior art systems make use of magnetically driven (solenoid) servo valves at the head of a plurality of cylinders. In U.S. Pat. No. 4,324,212 entitled "Compressed Air Starter," a capacitive transmitter rotated in relation to the rotation of the crank shaft generates a signal during a portion of the angle after top dead center (TDC) for opening a solenoid-driven servo valve. With use of an electric distributor, only one capacitive transmitter is required. However, the advance angle (angle after TDC at which the solenoid valve opening is initiated) and duration angle (crank angle through which the valve is held open) are fixed, which is a significant drawback.

SUMMARY OF THE INVENTION

It is an object, according to the present invention, to provide a compressed air start-up system that detects the absolute angular position of the crankshaft or a shaft rotating, in synchronism therewith and an angular speed related to the angular speed of the crankshaft for generating and sending electrical signals to solenoid-operated pilot valves for opening and closing valves at the head of each driven cylinder connected to a compressed air source.

Briefly, according to the present invention, there is provided an in-head compressed air start-up system for an internal combustion engine comprising a crankshaft, a plurality of cylinders with pistons connected to the crankshaft, a plurality of solenoid-controlled valves for connecting a source of compressed air to a plurality of cylinders, the start-up system comprising an absolute rotary encoder for detecting the absolute angular position of the crankshaft and outputting an electrical signal indicative of the angular position, at least one programmed microcontroller for storing a table of the firing order of the cylinders, and the angular position of the crankshaft at which each piston reaches a uniform angular position relative to TDC. The microcontroller is further programmed for comparing the signal indicative of angular position of the crankshaft to the firing order table and generating a signal to open a solenoid valve to cause rotation of the crankshaft. The microcontroller compares a signal indicative of angular position of the crankshaft to the firing order table and generates a plurality of signals to sequentially open and close solenoid valves to cause rotation of the crankshaft. Preferably, the solenoid valves are pilot valves that control the in-head start-up valves. Preferably, two cylinders can be connected to the compressed air source during overlapping periods. Preferably, the microcontroller is programmed for detecting the rotational speed of the crankshaft and adjusting the angle relative to TDC at which a solenoid-controlled valve is opened. More preferably, the microcontroller is programmed to establish an open duration angle which may vary with RPM and for generating electrical signals opening a solenoid-controlled valve for a given angular period.

In one embodiment, the microcontroller is programmed to provide for jog rotating the crankshaft to bring the pistons into a better position for start-up. Preferably, the microcontroller is programmed for jog rotating the crankshaft in the reverse of the normal operating direction.

In another embodiment, the microcontroller is programmed to enable the user to store a firing order table appropriate to a selected engine, which table records TDC positions (or a fixed angle or offset from TDC) of all pistons in an angular measure relative to TDC of the piston in a first cylinder. The firing order table records TDC positions or the like within one revolution of the crankshaft for two strokes per cycle engines and TDC positions or the like within two revolutions of the crankshaft for four strokes per cycle engines.

Preferably, the absolute angle encoder for detecting absolute angular position of the crankshaft produces a magnetic pick-up signal from a sensor associated with a shaft that rotates an integral number of times for each rotation of the crankshaft. The encoder outputs two substantially sinusoidal analog signals 90 degrees out of phase. A microcontroller digitizes the sinusoidal signals, calculates the ratio of the digitized signals, and uses an Arctan function to calculate the absolute angular position of the crankshaft.

Preferably, the start-up system, according to the present invention, is provided with an input device, such as a keyboard or keypad, for inputting values to the firing order table stored in the microcontroller, including the number of cylinders, the firing order, and uniform angular opening positions relative to TDC for pistons in all cylinders having solenoid-operated valves. It is further preferred to provide for inputting a function-relating advance of valve opening to crankshaft rotation speed. In one embodiment, the function may be inputted by inputting a series of pairs of rotation speeds and corresponding advance angles.

More preferably, the start-up system is provided with an input device for inputting a function relating the open duration angle to crankshaft rotation speed. In one embodiment, the function may be inputted by inputting a series of pairs of rotation speeds and corresponding open duration angles.

According to one embodiment of the present invention, a display is provided for displaying the crank angle relative to TDC of a first cylinder, the cylinders that have open solenoid valves, RPM, and/or the status of a start-up attempt. Displayed status values may correspond to READY to start, TRYING to rotate, PURGING by low speed rotation, FIRING when combustion causes the engine to speed up, and RUNNING.

The repetition rate of the signals sequentially opening and closing solenoid valves may be limited to limit the rotational speed of the crankshaft.

Preferably, the microcontroller is programmed: (a) to initiate rotation and control low speed purge cycles prior to initiating and controlling full speed start-up, (b) to cause the open duration angle to diminish to zero as the speed increases to a starting speed, and (c) after a selected number of cycles at which the open duration angle is zero, to lock out the starting system until a new starting sequence is attempted.

Preferably, the start-up system, according to the present invention, further comprises a sensor for measuring and outputting a signal indicative of the pressure in the compressed air source to the microcontroller and the microcontroller is programmed to prevent an attempted start-up if the pressure in the compressed air source is below a preset threshold and to terminate an attempted start-up if the pressure in the compressed air source falls below a preset threshold.

In a preferred embodiment, the start-up system, according to the present invention, comprises a first microcontroller for detecting the absolute angular position of the crankshaft and outputting an electrical signal indicative of the angular position. The microcontroller may have plural onboard ADCs for digitizing the sinusoidal signals generated by an absolute rotary encoder and a CPU for calculating the ratio of the digitized signals, performing an Arctan function calculation on the ratio, and outputting the absolute angular position. A second microcontroller compares the signal indicative of angular position of the crankshaft to the firing order table and generating a signal to open solenoid valves to cause rotation of the crankshaft.

In a most preferred embodiment, the start-up system, according to the present invention, the microcontroller is programmed to recognize an angular position unfavorable to start-up and to automatically rotate the crankshaft to a position favorable to implementing a normal starting sequence. The rotation may be counter to its normal running direction.

BRIEF DESCRIPTION OF THE DRAWINGS

Further features and other objects and advantages will become clear from the following description made with reference to the drawings in which:

FIG. 6 is a flow diagram of a program for a microcontroller to convert the signals from an absolute angle encoder to degrees or the like;

DESCRIPTION OF THE PREFERRED EMBODIMENTS

Figure 1:
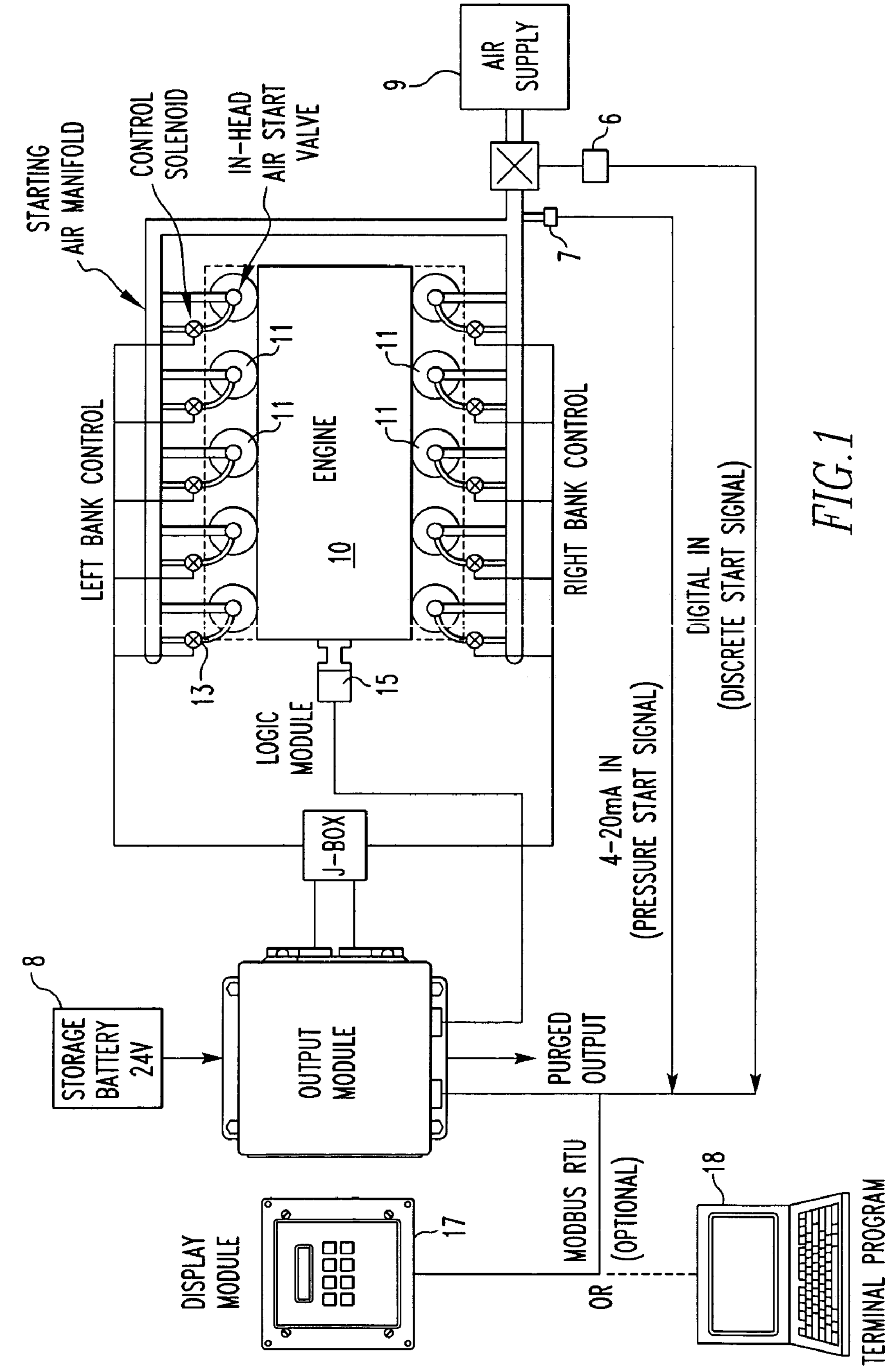
FIG. 1 is an over schematic of an air start-up system according to the present invention showing the engine, a logic module, output module, and a display/input module.

FIG. 1 schematically illustrates a ten-cylinder internal combustion engine 10 with two banks of five cylinders. Located in each cylinder head is an in-head air start valve 11 which is actuated with a pilot valve 13. A compressed air reservoir 9 is connected to a manifold 12 that supplies compressed air to both the pilot valves 13 and the in-head air start valves 11. The in-head air start valves 11 are pressure-operated check valves and will not open if the pressure in the cylinder exceeds the reservoir pressure. A piston is provided in each cylinder in the known manner and is connected to the crankshaft of the engine. When compressed air is admitted by an in-head air start valve 11 beginning when the piston is near top dead center (TDC) and during a portion of the power stroke, the piston is forced toward the crankshaft causing rotation of the crankshaft. By opening and closing the in-head air start valves 11 in the proper sequence, the cranking speed (start-up speed) of the engine can be raised to light-off speed at which the explosions of air/fuel mixtures in the cylinders drive the engine. One or more camshafts are normally driven in synchronization with the crankshaft to open and close the inlet valves in the head for admitting the air/fuel mixture and the exhaust valves for exhausting the products of combustion. The system described to this point is typical of prior art in-head compressed air start-up systems.

It is a feature of the present invention that associated with a camshaft or the crankshaft is an angular position sensor of the type known as an absolute rotary encoder. The encoder outputs signals indicative of an angular position of the crankshaft relative to TDC of the first cylinder in the firing order. This angular position information is available at all operating speeds and even when the engine is at rest. A logic module 15 processes this position information and instructs an output module 16 to use power from a storage battery 8 or the like to activate the solenoid-controlled pilot valves. The logic module generates cylinder select and firing signals that are applied to the output module as will be explained. Also, digital status information signals are passed from the logic module 15 through the output module 16 to a display/keypad input module 17 or a computer terminal 18. Setup signals can be passed from the display/keypad input module 17 or the computer terminal 18 to the logic module. A pressure sensor 7 may be connected to the manifold which inputs a signal to the logic module. Also, a manual inhibit switch 6 may input a signal to the logic module.

Figure 3:
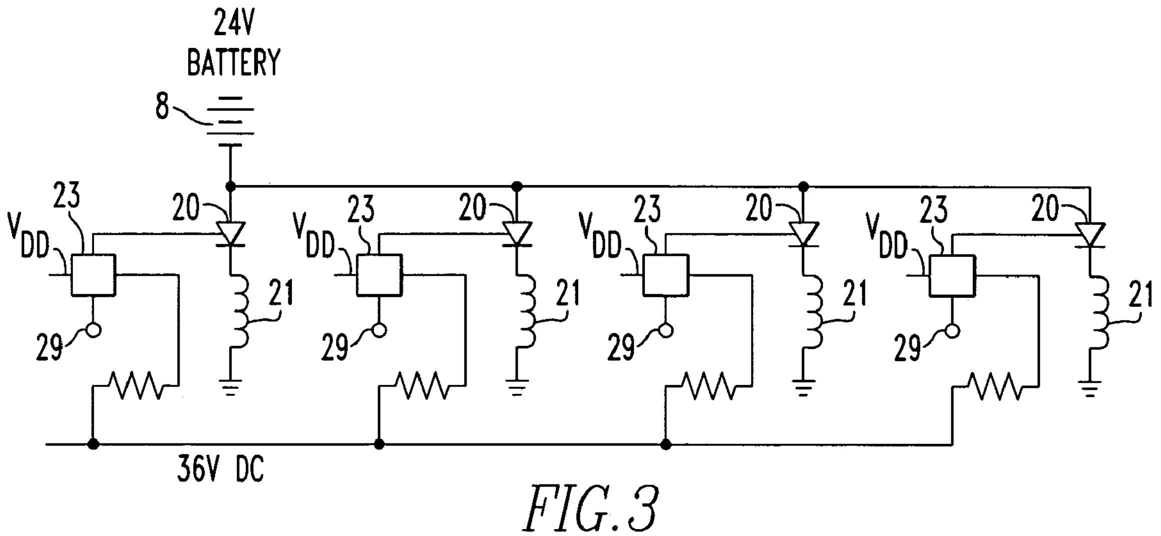
FIG. 3 is a schematic circuit diagram of an output section of the output module.
Figure 4:
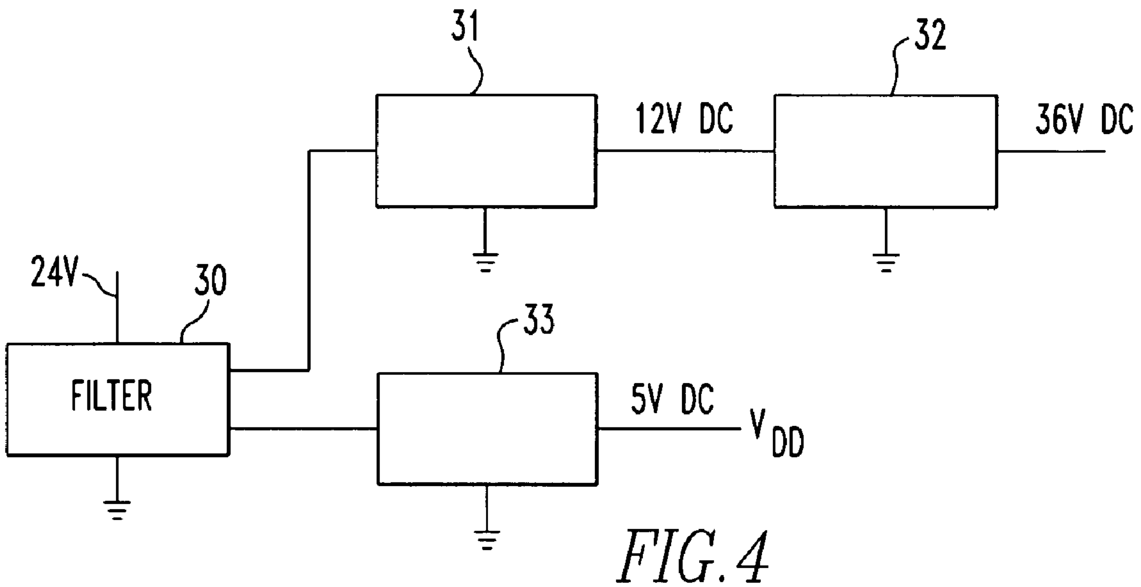
FIG. 4 is a schematic circuit diagram of a power supply in the output module.

The output module 16 comprises a firing logic section (see FIG. 2), an isolated output section (see FIG. 3), and a power supply section (see FIG. 4). Referring to FIG. 3, the isolated output section of the output module comprises power transistors 20, one for each solenoid valve coil 21, for gating unregulated electrical energy from a storage battery, say a 24-volt storage battery, to the solenoid valve coils 21. Each power transistor has a gate that is controlled through an optoMOS coupler 23. The optoMOS couplers 23 control a 36-volt gate signal applied to the power transistors. A suitable optoMOS coupler is the OMA160.

Figure 2:
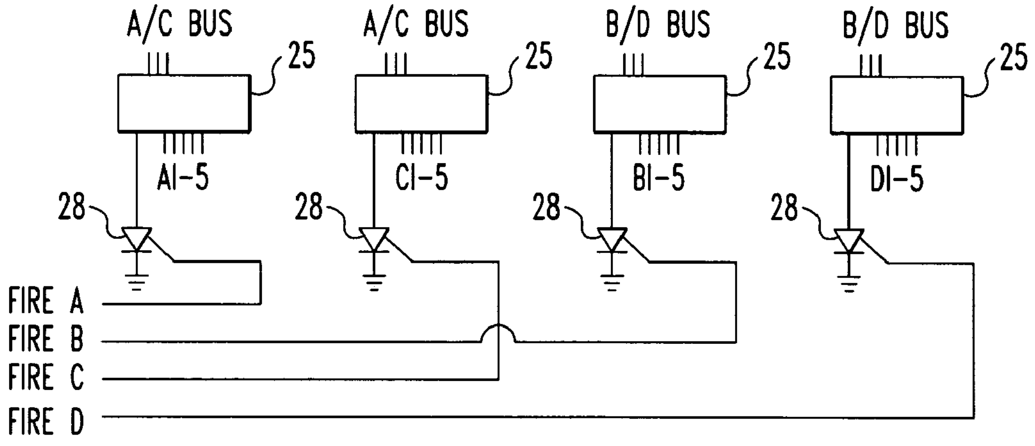
FIG. 2 is a schematic circuit diagram of a logic section of the output module.

Referring to FIG. 2, the firing logic section of the output module receives from the logic module at least two sets of binary cylinder select signals (A/C bus, B/D bus) and at least two firing signals (Fire "A," Fire "B," Fire "C," and Fire "D"). In this way, compressed air can be supplied to at least two cylinders in overlapping angular periods. The binary cylinder select signals generated are input to two or more analog demultiplexer IC's 25 having binary control inputs for selecting discrete analog output channels (A 1-5, C 1-5, B 1-5, and D 1-5). A suitable analog demultiplexer is the C4051. When a given analog output channel is selected, the analog output signal is applied to the optoMOS coupler 23 in the output module already described. Thus, a single power transistor 20 and, therefore, solenoid valve coil 21, is controlled at one time by a given demultiplexer IC 25 in the firing logic section. Each demultiplexer IC 25 has pull-down transistor 28 attached to the chip input terminal enabling the selected output channel to be pulled to ground. The firing signals (e.g., Fire "A") are applied to the gate of the pull-down transistor 28 to control the angular periods during which the selected analog output channel grounds a control terminal 29 of an optoMOS coupler 23.

Referring to FIG. 2, the power supply section is connected to a storage battery 8, for example, a 24-volt rechargeable vehicle battery. The 24-volt input is filtered by filter 30 and regulated by regulator 31, for example, to 12 volts, and the regulated output is applied to a DC-to-DC converter 32 to provide a 36-volt DC supply for controlling the power transistors 20 in the output section that supplies unregulated 24 volts from the battery to the coils 21 of the solenoid valves. The filtered input from the storage battery 8 is also applied to a 5-volt regulator 33 for supplying VDD for the circuitry in all modules. A suitable DC-to-DC converter 32 is the HPR107, a suitable 12-volt regulator 31 is the LM341-12, and a suitable 5-volt regular 33 is the 2945.

Figure 5:
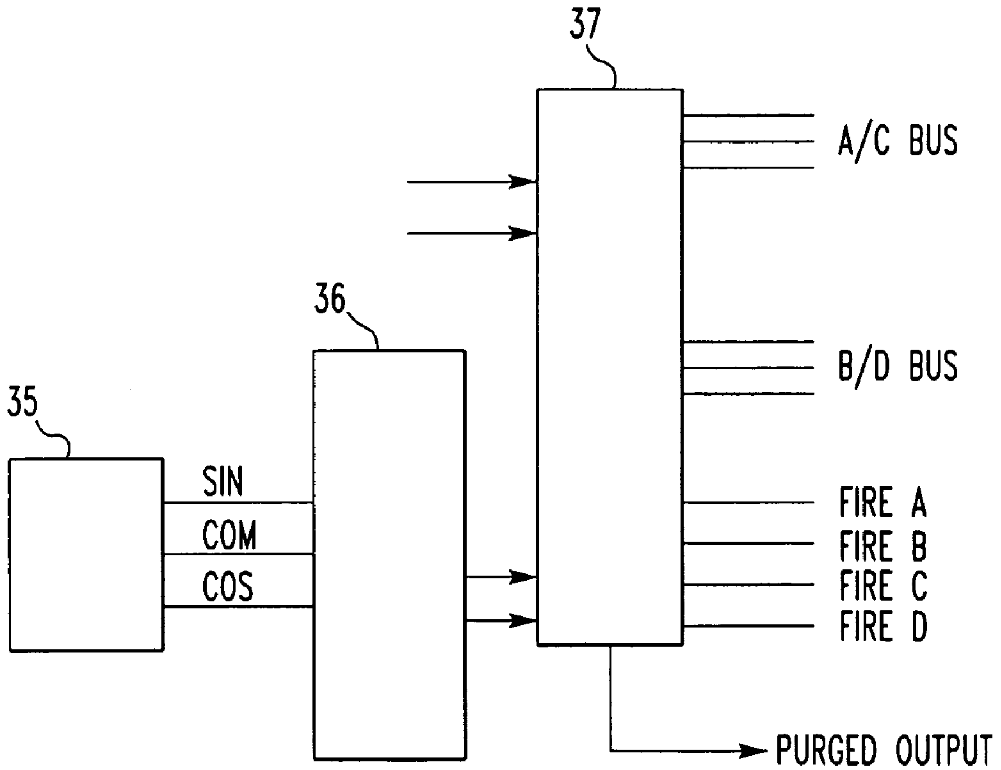
FIG. 5 is a schematic circuit diagram of the logic module.

Referring to FIG. 5, the logic module includes a two-axis Hall effect sensor 35 the outputs of which are sine and cosine signals, with periods corresponding to one or more rotations of the crankshaft. A two-axis Hall effect integrated circuit is a non-contact sensing device making available the ability to sense 360 degrees of angular position. These are available from various suppliers. We have used the Sentron 2SA-10 integrated two-axis Hall sensor. If the firing sequence of all the engine cylinders takes place in one rotation of the crankshaft, the period of the sine and cosine signals is one rotation and if the firing order sequence takes more that one rotation of the crankshaft, the period of the sine and cosine signals is a period of multiple rotations. The magnetic elements rotating relative to the Hall sensor may be rotated by the camshaft, which normally makes one rotation per firing sequence. The sine and cosine signals are digitized. From the signs (positive or negative) of the sine and cosine signals, the quadrant is easily determined. The arctangent of the absolute value of the ratio of the sine and cosine signals provides an angle between 0 and 90 degrees within the quadrant identified.

The sine and cosine signals are digitized by an onboard analog-to-digital converter (ADC) on a microcontroller 36 that is programmed to, at intervals, input and the digitized sine and cosine signals, determine the quadrant from the signs of the signals, and perform the ratio and arctangent functions prior to outputting angular positions of the crankshaft at approximately every degree of crankshaft rotation. A suitable microcontroller is a C8051F020.

In a preferred embodiment, a second microcontroller 37 calculates the rotational speed of the crankshaft, and based on that speed and the angular position of the crankshaft outputs cylinder select signals (e.g., A/C bus) and firing signals (e.g., Fire "A") to the output module. The cylinder select and firing signals are made with reference to a previously stored TDC firing order table which holds the TDC positions or the like of each cylinder (in degrees or other angular measurement) relative to the top dead center position of a first cylinder in the firing order. The firing order table records TDC positions or uniform positions relative to TDC within one revolution of the crankshaft for two strokes per cycle engines and within two revolutions of the crankshaft for four strokes per cycle engines. The second microcontroller 37 outputs a fuel/air or ignition enable/inhibit signal to prevent fuel/air or ignition until after an engine purge by a selected number of engine revolutions at light-off speed.

Figure 15:
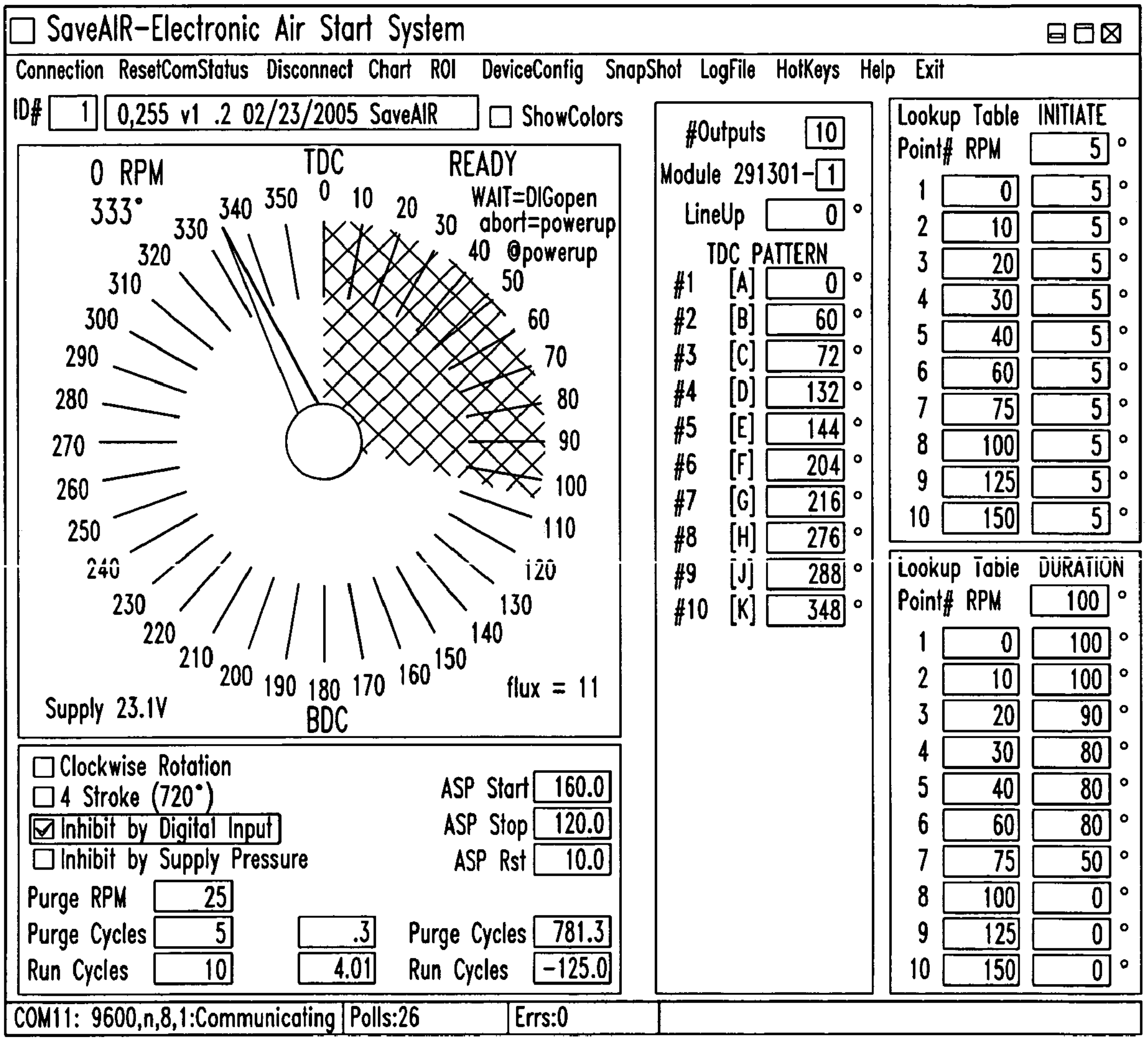
FIG. 15 is an optional computer monitor display for a start-up system, according to the present invention.

Before use, the start-up system must be configured for the particular engine with which it is being used. The firing order table already described needs to be configured by inputs from the keypad 17 or terminal 18. The actuation signals are initiated with reference to two other tables; namely, the initiation table and the duration table. These also must be configured from the keypad or terminal. The initiation table associates a plurality of crankshaft rotation speeds (RPM, for example) with an angular position relative to TDC for initiating opening of the in-head start-up valves. This table is used to define the advance of the valve openings as speed increases to accommodate delay in the mechanical opening of the valves. The duration table associates a plurality of crankshaft rotation speeds with the open duration angle for establishing an actuation signal. As the speed increases from rollover to light-off, the duration angle may diminish. The duration angle is never more than the angle for a single stroke of the piston and becomes zero at light-off speed. The tables each define a function. Other techniques for defining these functions, such as equations, can be used. For a graphic illustration of a firing order table, initiation table, and open duration table, see FIG. 15. The microcontroller may be responsive to a number of other signals, such as manual inhibit and low air signals. For this purpose, additional configuration is required. If the manual inhibit is used, the microcontroller 36 must be configured by setting the DIGinput bit. The minimum air supply pressure to begin starting is stored at Air.Start. The minimum air supply pressure to continue cranking is stored at Air.Stop. The air supply pressure required to reset the system for a new cranking attempt after a start sequence has ended is stored at Air.Reset. The particular embodiment described is made to be used with a 4–20 milliamp transmitter to monitor air pressure. The calibration point equal to the full scale psi ×1.5625 is stored at Air.Span. The value corresponding to zero volts coming from the sensor is set at Air.Zero.

The microcontroller 37 may establish the duration of the actuation signals and, therefore, the open angle duration by use of count-up or countdown timers into which a count can be stored and incremented or decremented. Since the count is incremented or decremented in degrees of rotation, the count for a given open angle will not vary with RPM.

Figure 14:
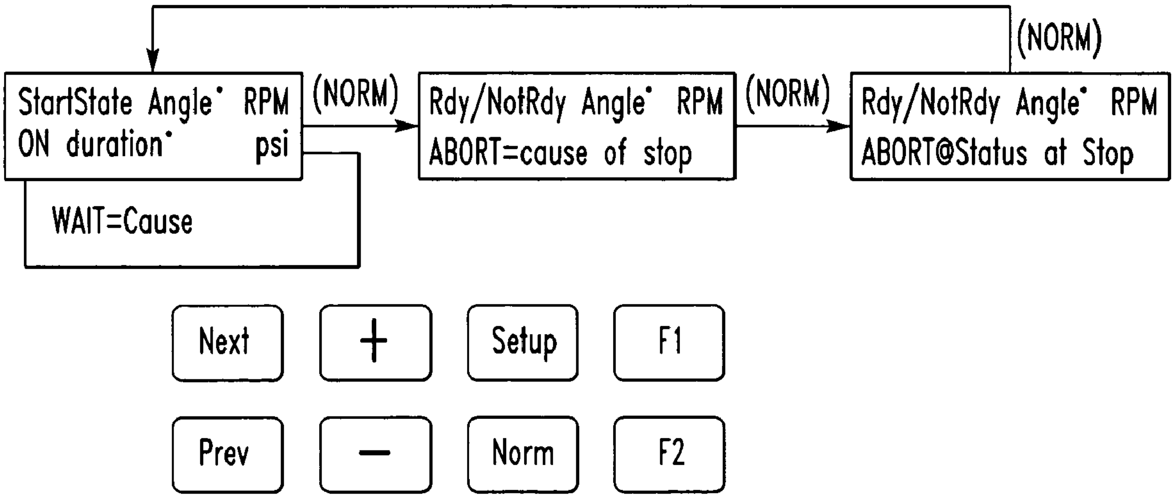
FIG. 14 is a diagram illustrating the home screens and keypad of the keypad display module.

The microcontroller 37 is also programmed to output information to the display module, including crankshaft speed, angular position of the crankshaft, and operating status, such as READY to start, STARTING, and RUNNING (see FIG. 14). The microcontroller 37 is also programmed to allow input of the firing order table, the initiate table, and the duration table, along with other parameters particular to the engine on which the in-head start-up system is installed.

Figure 6:
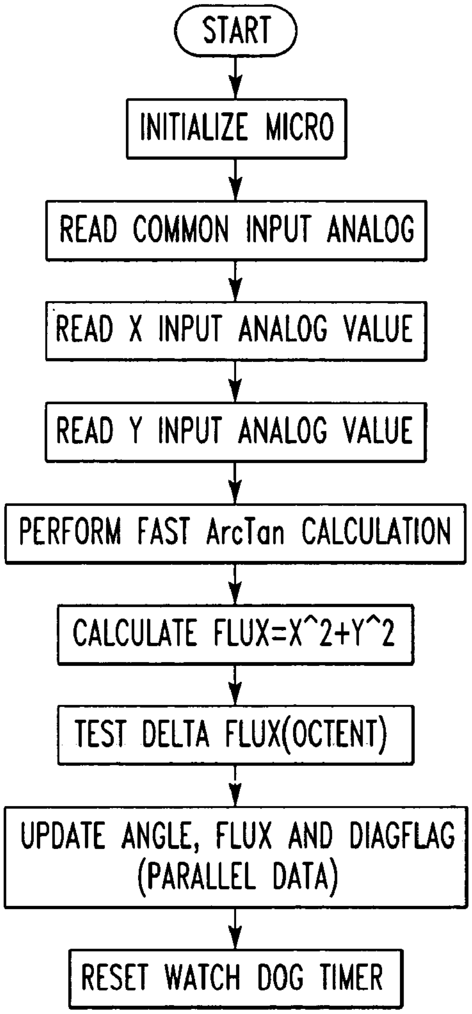

Referring to FIG. 6, the operation and programming of the first microcontroller 36 is described. After initialization, the Common X input and Y input are read from the two-axis Hall sensor 35. The X and Y inputs are normalized with reference to the Common input and the normalized values are used to perform an ArcTan calculation. The relative flux detected by the two-axis Hall sensor 35 is determined by adding the squares of the normalized X and Y inputs. This is used to determine if the Hall sensor is at a proper distance from the rotating magnetic element. The maximum values of the normalized X and Y inputs are compared to provide a DetaFlux value used to determine if the Hall sensor is properly orientated relative to the rotating magnetic element. Finally, the Angle and Flux values are placed on output ports and a delay reset for the repetition of this task.

Figure 7:
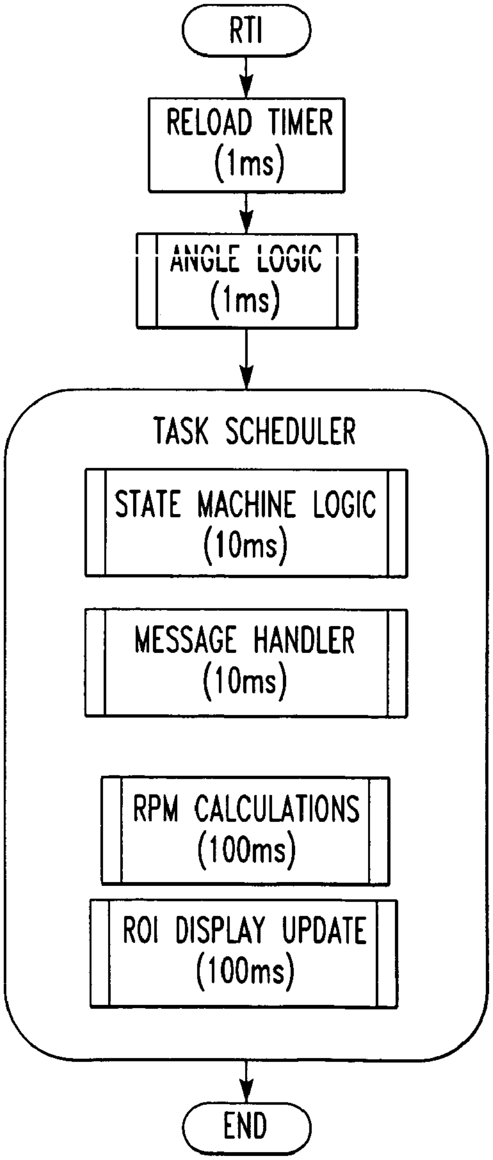
FIG. 7 is an overall flow diagram of an interrupt microcomputer program for the air start-up system.

Referring to FIG. 7, the main repeating routine for the second microcontroller 37 is described. It is an interrupt-driven task. Subtasks are performed at various intervals. The angle logic is repeated every 1 ms, the state machine logic every 10 ms, RPM calculations every 100 ms, and display updates every 100 ms.

Figure 8:
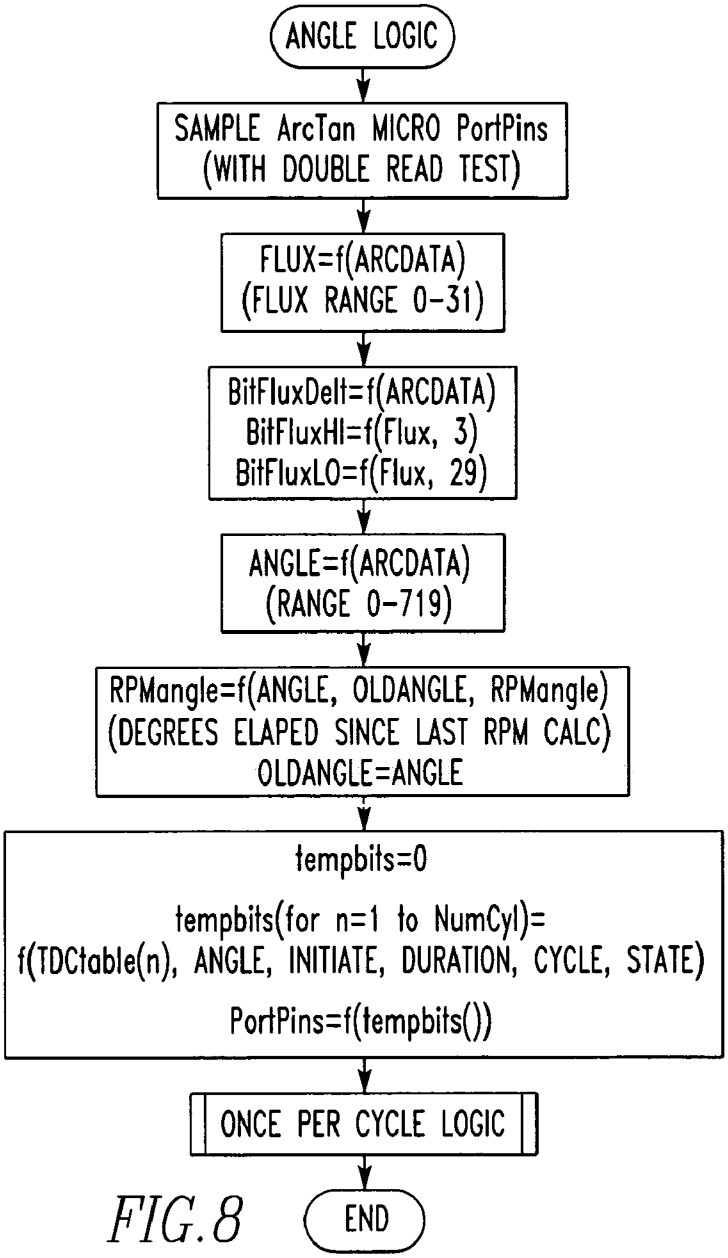
FIG. 8 is flow diagram for the angle logic microcomputer program.

Referring to FIG. 8, the Angle Logic subtask is described. The data generated by the first microcontroller (ARCDATA) is input to the second microcontroller 37. The flux data is tested to see if it is in an acceptable range indicative of rotation of the engine. It is further tested against minimum and maximum values, and the FluxDelt value is determined. BitFluxLo, BitFluxHi, and BitFluxDelt flags are set accordingly. Next, the angle data is accessed. From this, the RPMangle value (degrees lapsed since last RPM calculation) is obtained from a function having the parameters Angle (present position) and OldAngle (last position).

Next, TDC tables for each cylinder are set up for initiating and controlling the duration of the firing signals for that cylinder's servo valve. The parameters for setting up the tables include the TDC angle for the cylinder from the firing order table, the initiate angle from the initiate table, and the duration angle from the duration table, and the cycle (two or four). The tables and the current angle are used to output the cylinder select and firing signals.

Figure 9:
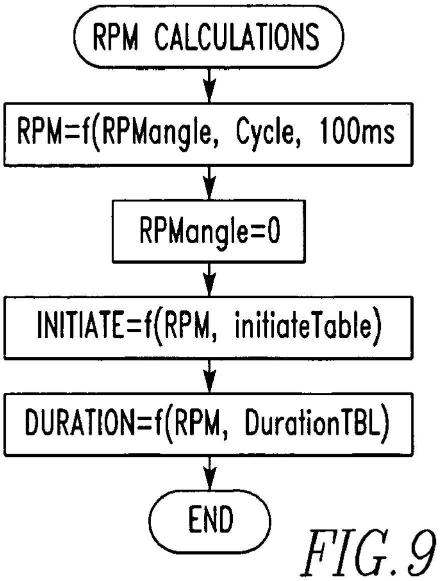
FIG. 9 is a flow diagram for the RPM program calculations and adjustment made according to RPM.

Referring to FIG. 9, the RPM calculation routine is described. The RPMangle calculated in the Angle Logic task is used with the Cycle parameter and the 100 ms interval to calculate the RPM. The initiate RPM value is then used to set the initiate value and the duration value using the initiate table and the duration table, respectively.

Figure 10:
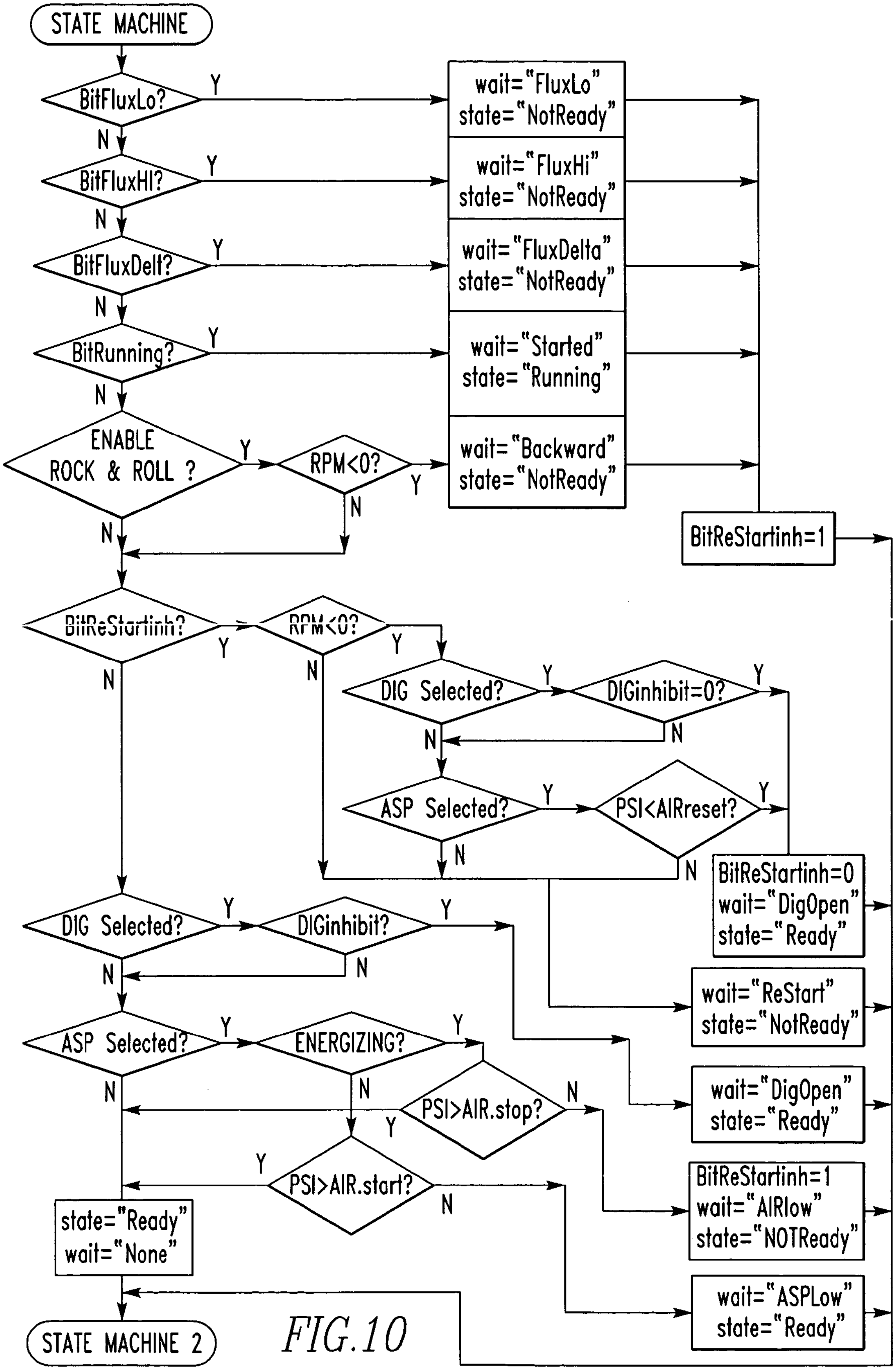
FIG. 10 is a flow diagram for the preparatory portion of the state machine program for the microcontroller.

Referring to FIG. 10, the second microcontoller 37 is programmed with a state machine to provide for safe operation. The state machine checks various status bits that were previously set at set-up or by tasks running in the background. If status bits BitFluxLo, BitFluxHi, BitFluxDelt, BitRunning, or Rock&Roll have been set, then the BitReStartInh bit is set, preventing further attempts to restart the engine without resetting of the BitReStartInh bit. The BitFluxLo bit is tested and, if set, the starting system is held in the "NotReady" state and a message "wait FluxLo" is displayed to inform the operator that the absolute rotary encoder needs adjustment. Similar tests are made of the BitFluxHi and BitFluxDelt bits for the same reason and to the same effect. The next test is of the BitRunning bit. The BitRunning bit is set following a successful start-up. If so, the system is placed in the "Running" mode and "WAIT=Started" is displayed. For engines that have a dead spot, the Rock&Roll bit is set to initiate a reverse jog program to move the engine away from the dead spot. If the reverse jog does not take place (negative RPM not detected), the system is placed in the NotReady state and "WAIT=Backward" is displayed. Reverse jog is effected by pulsing an in-head valve connected to a piston on the up (compression) stroke.

If the status bits already described are not set, the BitReStartInh bit is tested. If it is set because the engine had been running and is now not rotating, a test is made to determine if the DIGinhibit (manual inhibit has not been reset) and the PSI<AIR.reset are set. If they have, indicating that sufficient air is available for an attempted restart, the BitReStartInh is reset, the state is set to Ready, and "WAIT=DigOpen" is displayed, meaning the starter is inhibited because the digital input has not been grounded. If sufficient air is not available, the system remains in the NotReady state and "WAIT=Restart" is displayed. This portion of the program makes sure that restart is not attempted when there is insufficient air or the operator has required that the manual attention is always required before a restart.

If the program moves past the BitReStartInh test and the DIGinhibit is reset by grounding, the program moves to test the ASP selected bit.

The next portion of the program starting with the ASP Selected? test is for assuring adequate air is available to start (PSI>AIR.start) and air pressure does not drop below AIR.stop during start-up. If the tests outlined in FIG. 11 are completed satisfactorily and, therefore, the system is in the Ready state, start-up can be attempted.

Figure 11A:
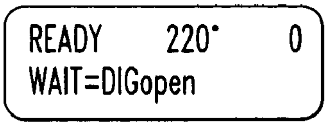
FIGS. 11A, 11B, and 11C are displays that might be observed during the processing of the preparatory portion of the state machine program.
Figure 11B:
Figure 11C:

FIGS. 11A, 11B, and 11C illustrate possible displays during the states described in the preceding paragraph.

Figure 12:
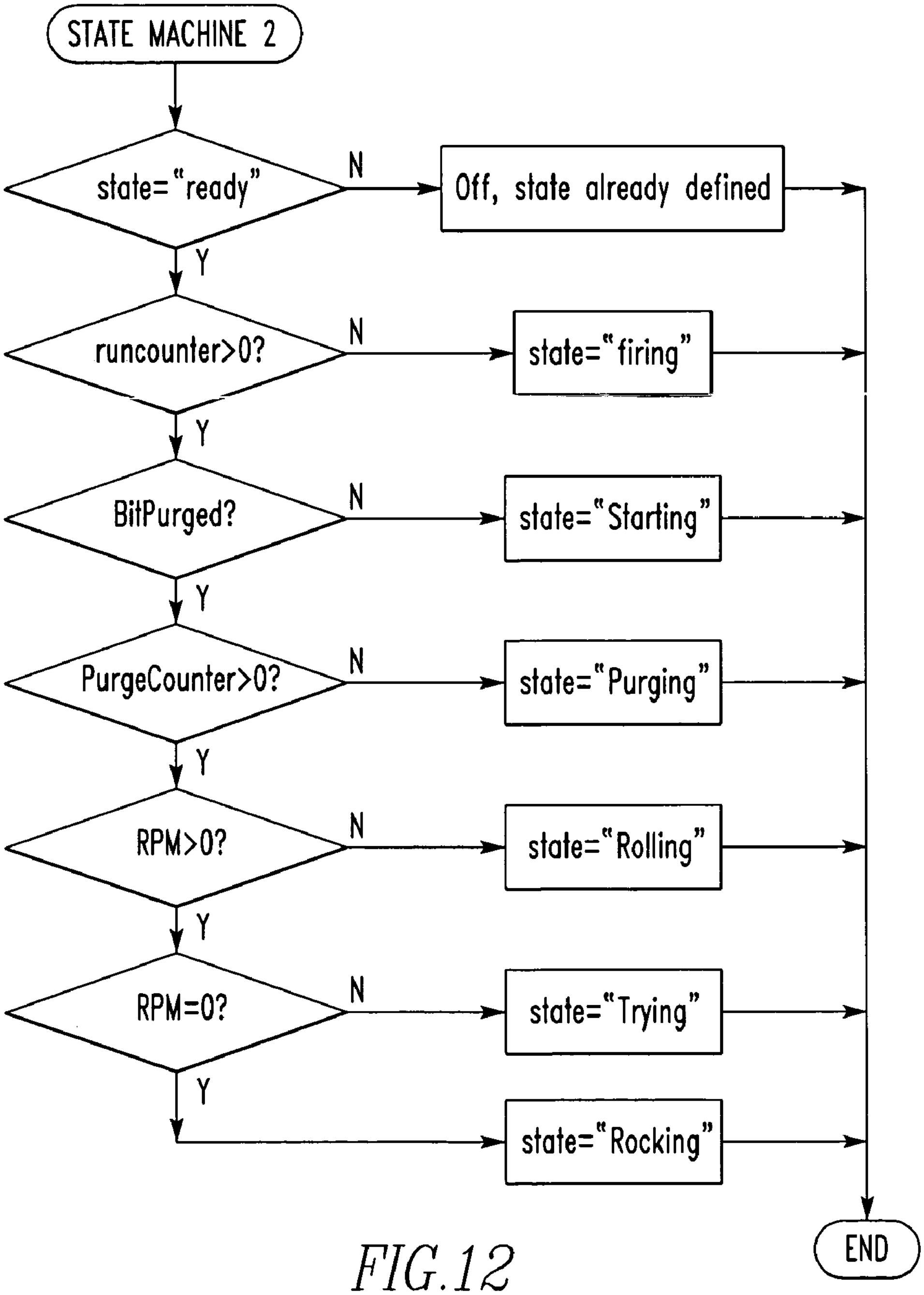
FIG. 12 is a flow diagram of the start-up and running portion of the state machine program for the microcontroller.
Figure 13A:
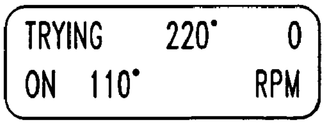
FIGS. 13A to 13F are displays that might be observed during the processing of the start-up and running portion of the state machine program.
Figure 13B:
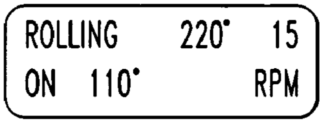
Figure 13C:
Figure 13D:
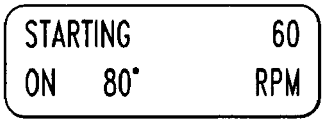
Figure 13E:
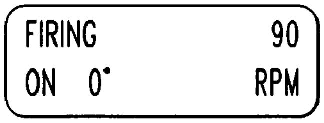
Figure 13F:

The operation of the state machine (programmed in the microcontroller) during start-up is described with reference to FIG. 12. The starting system enters the TRYING state when start-up is commanded, the solenoids are energized, but the engine is not yet turning. In other words, the in-head valves are to be opened to start the engine and the fuel/air and ignition are normally disabled by the purge output (also called the digital output). As the engine responds, the system enters the ROLLING state while the speed is too slow to begin purging. If the speed drops back to zero the state will return to TRYING. When purging speed is reached, a number of rotations of the engine are counted. When a given purge count is satisfied, the digital output will reset, signaling that the engine is ready for fueling. If the speed drops below the purge RPM set point, the purge counter will restart from zero. From the PURGE state, the starting system enters the STARTING state, and the digital output is reset, waiting for ignition/fuel. When the speed of the engine causes the open duration of the in-head valves to be zero because combustion has occurred, the FIRING state is entered. The FIRING state is indicative of light off. When the duration has been at zero for RunCycles (a number of cycles programmed by the user), the starter is off and the RUNNING state is entered. The typical series of displays during the start-up procedure is illustrated in FIGS. 13A–13F.

The start-up system may be provided to detect the absolute angular position of the crankshaft and can be electronically zeroed to the TDC position of a first cylinder.

Having thus described our invention with the detail and particularity required by the Patent Laws, what is desired protected by Letters Patent is set forth in the following claims.

The invention claimed is:

1. An in-head compressed air start-up system for an internal combustion engine comprising a crankshaft, a plurality of cylinders with pistons connected to the crankshaft, a plurality of solenoid-controlled valves for connecting a source of compressed air to a plurality of cylinders, said start-up system comprising:

means for detecting the absolute angular position of the crankshaft and outputting an electrical signal indicative of the angular position;

computer means for storing a table of the firing order of the cylinders and the angular position of the crankshaft at which each piston reaches a desired angular position relative to top dead center (TDC), wherein the computer means compares the signal indicative of angular position of the crankshaft to the firing order table and generates a plurality of signals sequentially open and close solenoid valves to cause rotation of the crankshaft.

2. The start-up system according to claim 1, further comprising computer means for detecting the rotational speed of the crankshaft and means to adjust the angle relative to TDC at which a solenoid-controlled valve is opened.

3. The start-up system according to claim 2, further comprising means based upon the rotational speed of the crankshaft to establish an open duration angle for the electrical signal opening a solenoid-controlled valve to establish the open time of the valve.

4. The start-up system according to claim 1, further comprising computer means for jog rotating the crankshaft.

5. The start-up system according to claim 4, further comprising computer means for jog rotating the crankshaft in the reverse of the normal operating direction.

6. The start-up system according to claim 1, wherein said firing order table records TDC positions in an angular measure from TDC or the piston in a first cylinder.

7. The start-up system according to claim 1, wherein said firing order table records TDC positions within one revolution of the crankshaft for two strokes per cycle engines.

8. The start-up system according to claim 1, wherein said firing order table records TDC positions within two revolutions of the crankshaft for four strokes per cycle engines.

9. The start-up system according to claim 1, wherein the means for detecting absolute angular position of the crankshaft further comprises a magnetic pick-up signal from a sensor associated with a shaft that rotates an integral number of times for each rotation of the crankshaft.

10. The start-up system according to claim 9, wherein the means for detecting absolute angular position of the crankshaft outputs two substantially sinusoidal analog signals 90 degrees out of phase.

11. The start-up system according to claim 10, wherein the means for detecting absolute angular position digitizes the sinusoidal signals, calculates the ratio of the digitized signals, and uses an Arctan function to calculate the absolute angular position of the crankshaft.

12. The start-up system according to claim 1, further comprising input means for inputting values to the firing order table including the number of cylinders, the firing order, and uniform angular positions relative to TDC for pistons in all cylinders having solenoid-operated valves.

13. The start-up system according to claim 2, further comprising input means for inputting a function relating advance to crankshaft rotation speed.

14. The start-up system according to claim 13, wherein the means for inputting a function relating advance to crankshaft rotation speed includes inputting a series of pairs of rotation speeds and corresponding advance angles.

15. The start-up system according to claim 3, further comprising input means for inputting a function relating duration angle to crankshaft rotation speed.

16. The start-up system according to claim 15, wherein the means for inputting a function relating open duration angle to crankshaft rotation speed includes inputting a series of pairs of rotation speeds and corresponding duration angles.

17. The start-up system according to claim 3, wherein the computer means for establishing open duration angles comprises at least one count up or down timer into which a count can be stored and incremented or decremented to establish the interval during which an on-time signal is output.

18. The start-up system according to claim 1, wherein the computer means for generating a signal to open a solenoid-operated valve to cause rotation of the crankshaft can enable two or more cylinders to be connected to the compressed air source during overlapping periods.

19. The start-up system according to claim 1, having a display for displaying the crank angle relative to TDC of a first cylinder.

20. The start-up system according to claim 19, wherein the display indicates the cylinders that have open solenoid valves.

21. The start-up system according to claim 3, wherein the duration angle diminishes to zero as the speed increases to a starting speed.

22. The start-up system according to claim 21, wherein, after a selected number of cycles at which the open duration angle is zero, the starting system is locked out until a new starting sequence is attempted.

23. The start-up system according to claim 1, further comprising means for measuring and outputting a signal indicative of the pressure in the compressed air source to the computer means.

24. The start-up system according to claim 23, wherein the computer means prevents an attempted start-up if the pressure in the compressed air source is below a preset threshold.

25. The start-up system according to claim 23, wherein the computer means terminates an attempted start-up if the pressure in the compressed air source is below a preset threshold.

26. The start-up system according to claim 1, wherein the means for detecting the absolute angular position of the crankshaft can be electronically zeroed to the TDC position of a first cylinder.

27. The start-up system according to claim 19, wherein the display displays the status of a start-up attempt.

28. The start-up system according to claim 27, wherein status values correspond to READY to start, TRYING to start, PURGING by low speed rotation, FIRING the solenoid valves to bring up to speed, and RUNNING.

29. The start-up system according to claim 10, wherein the means for detecting the absolute angular position of the crankshaft and outputting an electrical signal indicative of the angular position further comprises a first microcontroller having plural onboard ADCs for digitizing the sinusoidal signals and a CPU for calculating the ratio of the digitized signals, performing an arctangent function calculation on the ratio, and outputting the absolute angular position.

30. The start-up system according to claim 29, wherein the computer means for comparing the signal indicative of angular position of the crankshaft to the firing order table and generating a signal to open a solenoid valve to cause rotation of the crankshaft comprises a second microcontroller being programmed to in response to the strobe signal from the first microcontroller to input the absolute angular position from said first microcontroller and in response thereto storing on-time values in said on-board timers and outputting on-time signals thereby.

31. The start-up system according to claim 1, wherein said computer means is programmed to recognize an angular position unfavorable to start-up and automatically rotating the crankshaft slowly to a position favorable to implementing a normal starting sequence.

32. The start-up system according to claim 31, wherein the crankshaft is rotated counter to its normal running direction.

33. The start-up system according to claim 1, wherein the computer means for comparing the signal indicative of angular position of the crankshaft to the firing order table generates a plurality of signals to sequentially open and close solenoid valves to cause rotation of the crankshaft.

34. The start-up system according to claim 33, wherein the repetition rate of the signals sequentially opening and closing solenoid valves is limited to limit the rotational speed of the crankshaft.

* * * * *